United States Patent [19]
Spaulding et al.

[11] Patent Number: 5,742,405
[45] Date of Patent: Apr. 21, 1998

[54] METHOD AND SYSTEM FOR FORMING MULTI-LEVEL HALFTONE IMAGES FROM AN INPUT DIGITAL IMAGE

[75] Inventors: Kevin Edward Spaulding, Spencerport; Rodney L. Miller, Fairport, both of N.Y.

[73] Assignee: Eastman Kodak Company, Rochester, N.Y.

[21] Appl. No.: 378,851

[22] Filed: Jan. 26, 1995

[51] Int. Cl.$^6$ .................. H04N 1/40; H04N 1/46
[52] U.S. Cl. .......... 358/456; 358/458; 358/534; 358/523
[58] Field of Search ............... 358/455, 456, 358/458, 465, 466, 534, 535, 523

[56] References Cited

U.S. PATENT DOCUMENTS

| | | | |
|---|---|---|---|
| 4,920,501 | 4/1990 | Sullivan et al. | 364/518 |
| 4,962,542 | 10/1990 | Klees | 382/54 |
| 5,077,615 | 12/1991 | Tsuji | 358/298 |
| 5,107,346 | 4/1992 | Bowers et al. | 358/447 |
| 5,109,282 | 4/1992 | Peli | 358/298 |
| 5,111,310 | 5/1992 | Parker et al. | 358/456 |
| 5,150,429 | 9/1992 | Miller et al. | 382/50 |
| 5,210,623 | 5/1993 | Weldy | 358/458 |
| 5,214,517 | 5/1993 | Sullivan et al. | 358/456 |
| 5,243,443 | 9/1993 | Eschbach | 358/455 |
| 5,267,054 | 11/1993 | Chang et al. | 358/456 |
| 5,289,294 | 2/1994 | Fujisawa | 358/461 |
| 5,291,311 | 3/1994 | Miller | 358/456 |
| 5,307,426 | 4/1994 | Kanno et al. | 382/50 |
| 5,323,247 | 6/1994 | Parker et al. | 358/456 |
| 5,339,171 | 8/1994 | Fujisawa et al. | 358/458 |
| 5,341,228 | 8/1994 | Parker et al. | 358/534 |
| 5,359,430 | 10/1994 | Zhang | 358/455 |

OTHER PUBLICATIONS

R. S. Gentile, E. Walowit and J. P. Allebach, "Quantization and Multilevel Halftoning of Color Images for Near Original Image Quality", J. Opt. Soc. Am. A 7, 1019–1026 (1990).
"Digital Halftoning", R. Ulichney, MIT Press, Cambridge, MA 1987.

Primary Examiner—Thomas D. Lee
Attorney, Agent, or Firm—Peyton C. Watkins

[57] ABSTRACT

A method for forming a multi-level halftone image from an input digital image having a plurality of pixels so that visibility of halftone patterns is minimized; comprises the steps of transforming input pixel values which represent the tone level of each pixel into modified pixel values which are approximately linear with perceived lightness; applying a multi-level halftoning process to the modified pixel values to produce halftone pixel values having a reduced number of tone levels which are uniformly distributed with respect to the modified pixel values; and transforming the halftone pixel values into output pixel values for permitting an output device to display the digital image so that visibility of halftone patterns is minimized.

27 Claims, 3 Drawing Sheets

1

METHOD AND SYSTEM FOR FORMING MULTI-LEVEL HALFTONE IMAGES FROM AN INPUT DIGITAL IMAGE

BACKGROUND OF THE INVENTION

1. Field of the Invention

The present invention relates generally to a method and system for forming multi-level halftone images from an input digital image, which generated halftone images minimize halftone patterns.

2. Description of the Related Art

For the purpose of printing images from a graphical display, such as the display screen of a computer, many such displays are typically only capable of printing binary images. In other words, at each position of the image there are only two possible output states, colorant or no colorant. For example, a traditional graphic arts printing press will either disperse ink or withhold ink at each location of the image. For monochrome imaging systems, this means that an image can only be made up of pixels that are either black or white. To create the illusion of continuous tone images, methods referred to in the art as "halftoning techniques" have been developed. With these techniques, the appearance of intermediate gray levels is created by taking advantage of the fact that the human eye acts as a low-pass filter and will average the intensity over a small local area of the image. It is, therefore, possible to locally vary the ratio between the white area and the black area to form varying levels of gray.

Although, historically, halftone dot patterns were created optically for images made on printing presses, presently the majority of halftone images are created on a computer using one of many presently known and utilized digital halftoning algorithms. Two widely used halftoning algorithms for digital printers, such as laser writers, are generally referred to in the art as periodic dither and error diffusion, both of which are available for further details in *Digital Halftoning*, R. Ulichney, (MIT Press, Cambridge, Mass., 1987).

Although halftoning techniques were originally developed for binary output devices, recent developments have made them available for multi-level output devices or, in other words, devices that produce a variety of different colorant levels. (For example see: R. S. Gentile, E. Walowit and J. P. Allebach, "Quantization and multilevel halftoning of color images for near original image quality," J. Opt. Soc. Am. A 7, 1019–1026 (1990)). There are several motivations in the art for performing multi-level halftoning. First, some output devices may only be capable of producing a limited set of output colors. For such displays, noticeable artifacts, such as contouring, will result if simple quantization methods are used to produce the image. Contouring is the visible transitions between adjacent output levels which typically result when many input levels are mapped to a single output level. Multi-level halftoning methods eliminate contouring artifacts by preserving the original average color level in a local image region. In some cases, the number of output colors of the display device is large enough so that contouring does not occur and, as a result, multi-level halftoning is generally not necessary. Even in such a case, there may be advantages to using multi-level halftoning techniques. For example, it may be possible to reduce the amount of RAM required in a printer or the disk-space required for an image file by reducing the number of bits required to store each image pixel. In this case, multi-level halftoning could be considered to be a form of image compression.

Gentile et. al. describe generalizations of both the conventional error-diffusion and dither techniques for use with multi-level image displays. They report a number of variations for each technique related to the form of the quantizer which is used to map the input color values to the quantized output color values. In particular, they describe two image independent quantizers, a "RGB cubical quantizer" and a "L*u*v* uniform quantizer."

The RGB cubical quantizer includes a one-dimensional quantizer which is applied to each channel of a digital image. The output colors for this quantizer form a cubical lattice in the RGB color space. The advantage of this form of quantizer is that it is simple to implement and fast to compute. The disadvantage, however, is that the visibility of the halftoning patterns will, in general, vary widely as a function of the input color value. This is particularly true when a linear quantizer, which is the simplest to implement and to compute, is used.

The L*u*v* uniform quantizer is implemented by first transforming the input color value to a uniform color space (such as the well known and standardized CIELUV color space) and performing the quantization in that space. The quantized color values must then be transformed to the output color space. An advantage of this method is that the visibility of the halftone patterns will be more uniform across the color space. The primary drawback is that the implementation is much more complex than the simple cubical quantizer due to the fact that transformations into and out of the uniform color space must be calculated for each pixel. These transformations involve either a series of mathematical equations or the use of multi-dimensional look-up tables (LUTs).

Consequently, a need exists for a multi-level halftoning method and apparatus for digital images which are simultaneously simple to compute and which produces halftone patterns having a uniform and minimum visibility.

SUMMARY OF THE INVENTION

It is an object of the present invention to provide a method and system for forming a multi-level halftone image from an input digital image having a plurality of pixels so that the visibility of halftone patterns is minimized.

It is an advantage of the present invention that the quantized image can be stored in a smaller amount of memory than the input image.

It is a feature of the present invention in that it utilizes transforming input pixel values which represent the tone level of each pixel into modified pixel values which are approximately linear with perceived lightness.

With this object in view, the present invention resides in a method for forming a multi-level halftone image from an input digital image having a plurality of pixels so that the visibility of halftone patterns is minimized, comprising the steps of (a) transforming input pixel values which represent the tone level of each pixel into modified pixel values which are approximately linear with perceived lightness; (b) applying a multi-level halftoning process to the modified pixel values to produce halftone pixel values having a reduced number of tone levels which are uniformly distributed; and (c) transforming the halftone pixel values into output pixel values for permitting an output device to display the digital image so that visibility of halftone patterns is minimized.

BRIEF DESCRIPTION OF THE DRAWINGS

In the course of the following detailed description, reference will be made to the attached drawings in which.

DETAILED DESCRIPTION OF THE INVENTION

Figure 1:
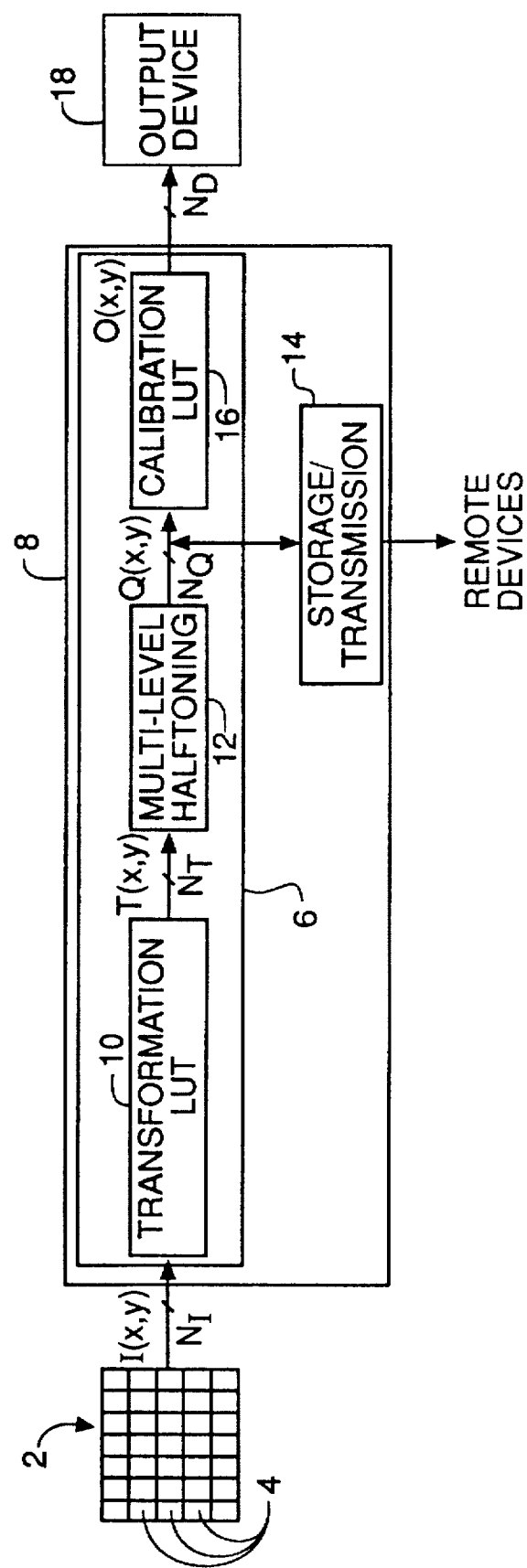
FIG. 1 is a schematic diagram of the present invention.

Referring now to FIG. 1, there is illustrated a schematic diagram of the present invention. As is well known in the art, an image sensor 2 typically includes a plurality of pixels 4 arranged in a contiguous, predetermined configuration. Each pixel 4 receives a portion of an incident image thereon, and when assembled in the predetermined arrangement, they collectively represent the total incident image in electronic form. Each pixel is represented in digital form by a value of 0–255 (I(x,y)), which value I(x,y) represents one of the plurality of shades between black and white or, in other words, the tone level I(x,y). Each pixel input value I(x,y) is inputted to a processor 6 of a printer 8, which processor 6 contains a transformation look-up table (LUT) 10 for transforming each pixel value I(x,y) into a transformed value T(x,y) on a perceived lightness scale. Each transformed value has the characteristic that the perceived lightness difference between adjacent transformed values is approximately constant, as will be described in detail below.

The transformed value T(x,y) is then manipulated by a multi-level halftoning step 12. It is instructive to note that the halftoning step 12 uses a uniform quantizer; in other words, it takes its input and reduces it to a scale having less intervals or reference points than the inputted value, so that an equal number of input values is mapped to each quantized value. Therefore, the perceived lightness difference between adjacent quantized levels outputted by the halftoning step Q(x,y) will also be a constant. As a result, the visibility of the halftone pattern will be uniform across all of the quantization intervals. This will minimize the visibility of the halftone patterns across the full tone scale of the output device. The quantized output Q(x,y), as an alternative to output to the output device 18, may go to a storage device 14, such as a disk drive or a random access memory, for storage of these values Q(x,y) or for transmitting to a remote location.

Before discussing the method of outputting the halftoning result Q(x,y) to the output device 18, the above described transformation LUT and multi-level halftoning step 12, will be discussed in detail. In the preferred embodiment of this invention, the transformation LUT 10 values are determined by computing the perceived lightness corresponding to each of the possible input levels, or pixel values I(x,y). These perceived lightness values are then quantized to one of different transformed output levels T(x,y). As an example, if the input image is an 8-bit video image, the normalized image intensity, I, is approximately given by:

$$I = \left(\frac{I_{CV}}{255}\right)^{\gamma} \quad (1)$$

where $I_{CV}$ is the input code value in the range 0 to 255, and $\gamma$ is the gamma of the video display. The perceived lightness can then be computed with one of the many formulas which can be found in the prior art. For example, the 1976 CIELAB formula gives the perceived lightness as:

$$L^* = \begin{cases} 116\left(\frac{Y}{Y_0}\right)^{1/3} - 16, & \left(\frac{Y}{Y_0}\right) > 0.008856 \\ 903.29\left(\frac{Y}{Y_0}\right), & \left(\frac{Y}{Y_0}\right) \leq 0.008856 \end{cases} \quad (2)$$

where $Y/Y_0$ is the normalized value of the Y tristimulus value. In this case, it can be assumed that $Y/Y_0$ is equal to the normalized image intensity, I. The value to be stored in the transformation LUT 10 can then be determined by quantizing the perceived lightness to $N_T$ possible levels $$T_{CV} = NINT\left(\frac{L^*}{100}(N_T - 1)\right), \quad (3)$$

where NINT( ) represents the nearest integer operation. The number of possible levels in the transformed image, $N_T$, should be chosen so that the lightness difference between adjacent transformed levels is substantially below the threshold of the smallest detectable difference. This will ensure that quantization artifacts are not created where many input code values are mapped to a single transformed code value. Often this will imply that $N_T > N_I$. Typical values for $N_T$ are in the range of 256 to 4096. A variety of relationships have been proposed in the literature to predict the perceived lightness under a variety of viewing conditions. Any of these could be used as an estimate of the perceived lightness when computing the transformation LUT rather than the CIELAB expression given in Eq. (2).

Figure 2:
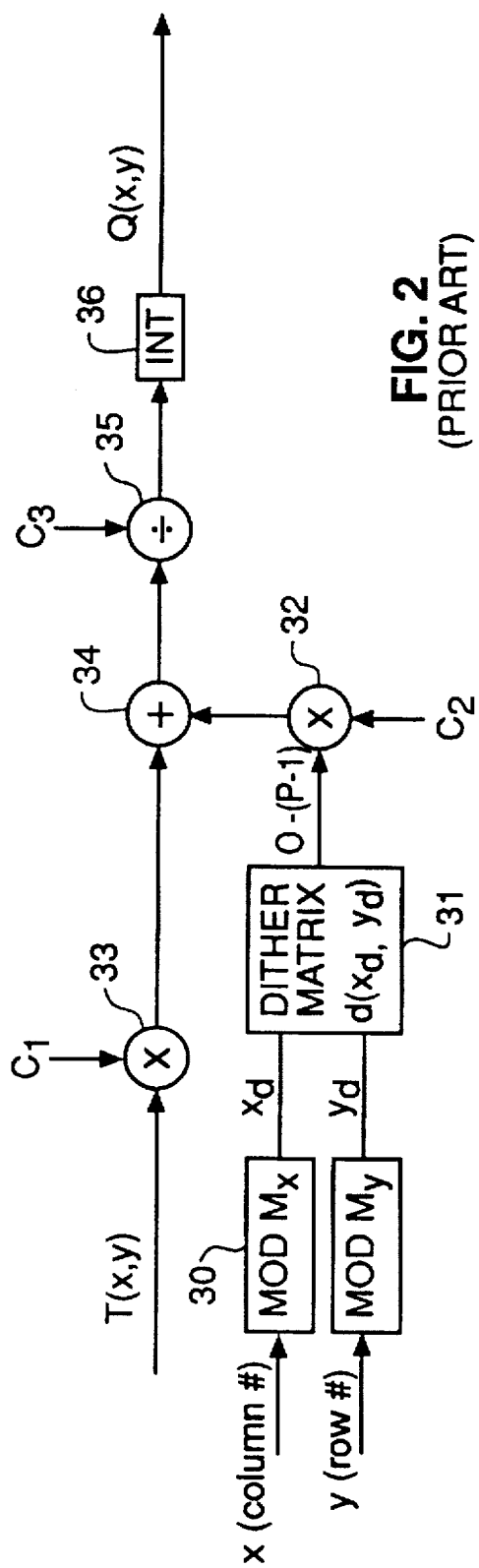
FIG. 2 is a block diagram of a dither matrix for performing multi-level halftoning.

As for the halftoning step 12, any number of different multi-level halftoning algorithms can be used to process the transformed image. Multi-level blue-noise dither and multi-level error diffusion are two of the preferred embodiments. FIG. 2 illustrates one implementation of a multi-level dither algorithm which is similar to that described by Gentile et. al. in "Quantization and multilevel halftoning of color images for near original image quality," J. Opt. Soc. Am. A 7, 1019–1026 (1990) which is hereby incorporated by reference. A dither matrix 31 has $M_x$ columns and $M_y$ rows and contains values in the range 0 to P-1, where P represents the number of different dither values stored in the matrix. A dither matrix entry at column xd and row yd of the dither matrix is selected by performing a modulo operation 30 on the x and y addresses corresponding to the current pixel in the transformed image. The modulo operation simply computes the remainder when the row number is divided by the number of rows in the dither matrix, or the column number is divided by the number of columns in the dither matrix. The use of the modulo operator has the effect of tiling the dither matrix over the image in a repeating fashion. A modulated image value is then computed by multiplying 32 the selected dither matrix value by a constant $C_2$, and adding 34 the resulting value to the transformed image value T(x,y) which has been multiplied 33 by a constant $C_1$. The modulated image value is then uniformly quantized by dividing 35 by a constant $C_3$ and truncating it to an integer 36 to form the quantized image value Q(x,y). The values of the constants $C_1$, $C_2$ and $C_3$ are chosen so that the amount of modulation introduced by the dither signal is matched to the size of the quantization interval. One such combination of scale factors is given by:

$$C_1 = \left(\frac{N_T}{N_T I}\right)\left(\frac{N_Q - 1}{N_Q}\right) \quad (4)$$

$$C_2 = \frac{N_T}{N_Q P}$$

$$C_3 = \frac{N_T}{N_Q}$$

The computational efficiency of the algorithm can be increased by incorporating the scale factor $C_1$ into the transformation LUT, incorporating the scale factor $C_2$ into the values stored in the dither matrix, and implementing the divide by the factor $C_3$ as a look-up table. If the value of $C_3$ is a power of two, the divide operation can also be implemented as a bit-shift operation on the modulated image value. Various forms of dither matrices can be used such as a clustered-dot pattern, or a Bayer dither pattern, or more preferably a blue-noise dither pattern (see U.S. Pat. Nos. 4,920,501, and 5,214,517 which are hereby incorporated by reference).

Figure 3:
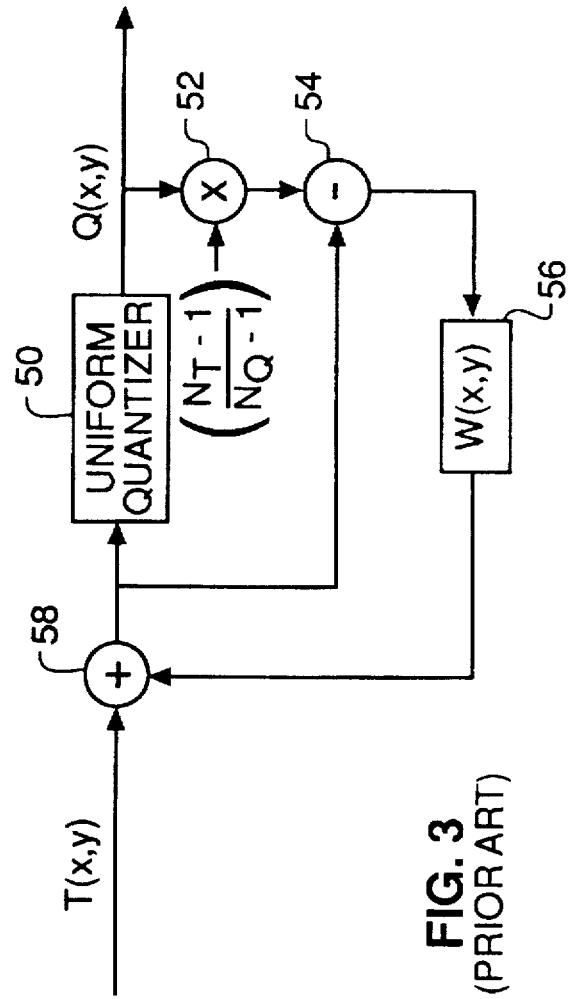
FIG. 3 is an alternative embodiment, multi-level error diffusion, for performing multi-level halftoning.

Referring to FIG. 3, there is illustrated a multi-level error diffusion algorithm which can be used for the multi-level halftoning step 12 in the present invention. The transformed image value T(x,y) for the current image pixel is quantized to $N_Q$ levels using a uniform quantizer 50 to form the quantized image value Q(x,y). A difference signal is computed 54 between the transformed image value and the quantized image value which has been scaled to have the same range as the transformed image using the multiplier 52. The difference signal represents the error introduced by the quantization process. The difference signal is multiplied by a series of error weights 56, and is added 58 to the transformed pixel values of nearby pixels which have yet to be processed. The propagation of the errors made during the quantization process to the nearby pixels insures that the mean of the transformed pixel values is preserved over a local image region.

Other multi-level halftoning methods can also be used besides the ones that are described here. The above examples should only be considered to be representative examples of the techniques which could be used for the present invention.

Following the multi-level halftoning step 12, the quantized image will contain $N_Q$ possible quantized levels. Since $N_Q$ will generally be substantially less than the number of possible input levels $N_I$, the amount of memory required to store the quantized image will be less than that required to store the input image. For example, if the input image had 256 possible input levels for each channel (8 bits/pixel/color), and the quantired image had 16 possible quantired levels for each channel (4 bits/pixel/color), the amount of memory required to store the image would be reduced by a factor of two. It can be seen that this invention is, in part, a form of image compression, but it has the advantage over conventional compression techniques that the computations to compute the quantized image are relatively simple, and that individual pixels within the quantized image can be directly addressed. The resulting reduction in the memory requirements can be useful for many applications. For example, frame buffers are frequently required to store images in various kinds of printers and image display devices. Use of the present invention can reduce the required amount of RAM by a factor of two or more with no visible reduction in the image quality. As another example, consider the case where the image must be transmitted across a data bus in a digital image processing system, or across a telecommunication line which connects different computer systems, use of the present invention will significantly reduce the time necessary to transmit the image data.

Referring back to FIG. 1, the quantized image value Q(x,y) is outputted to an output device 18, such as a printer or a video display, and converted to an output image which can be displayed on the appropriate output device 16. This is done by using the quantized pixel values Q(x,y) to address the calibration LUT 16. The calibration LUT 16 converts the quantized pixel values Q(x,y) into the form necessary O(x,y) for the output device to display the image. To construct the calibration LUT 10, it is necessary to determine the physical response of the particular output device 18. For example, the perceived lightness, which are produced by a typical printer, can be measured as a function of the display values. This information can then be combined with desired perceived lightness for each of the quantized values to compute the calibration table.

It is instructive to note that although the processing steps (i.e., transformation look-up table 10, multi-level halftoning, storage 14 and calibration) are shown within a processor 6 of a printer 8 in the preferred embodiment, they could be performed in any suitable computer hardware device, such as a host computer.

Figure 4:
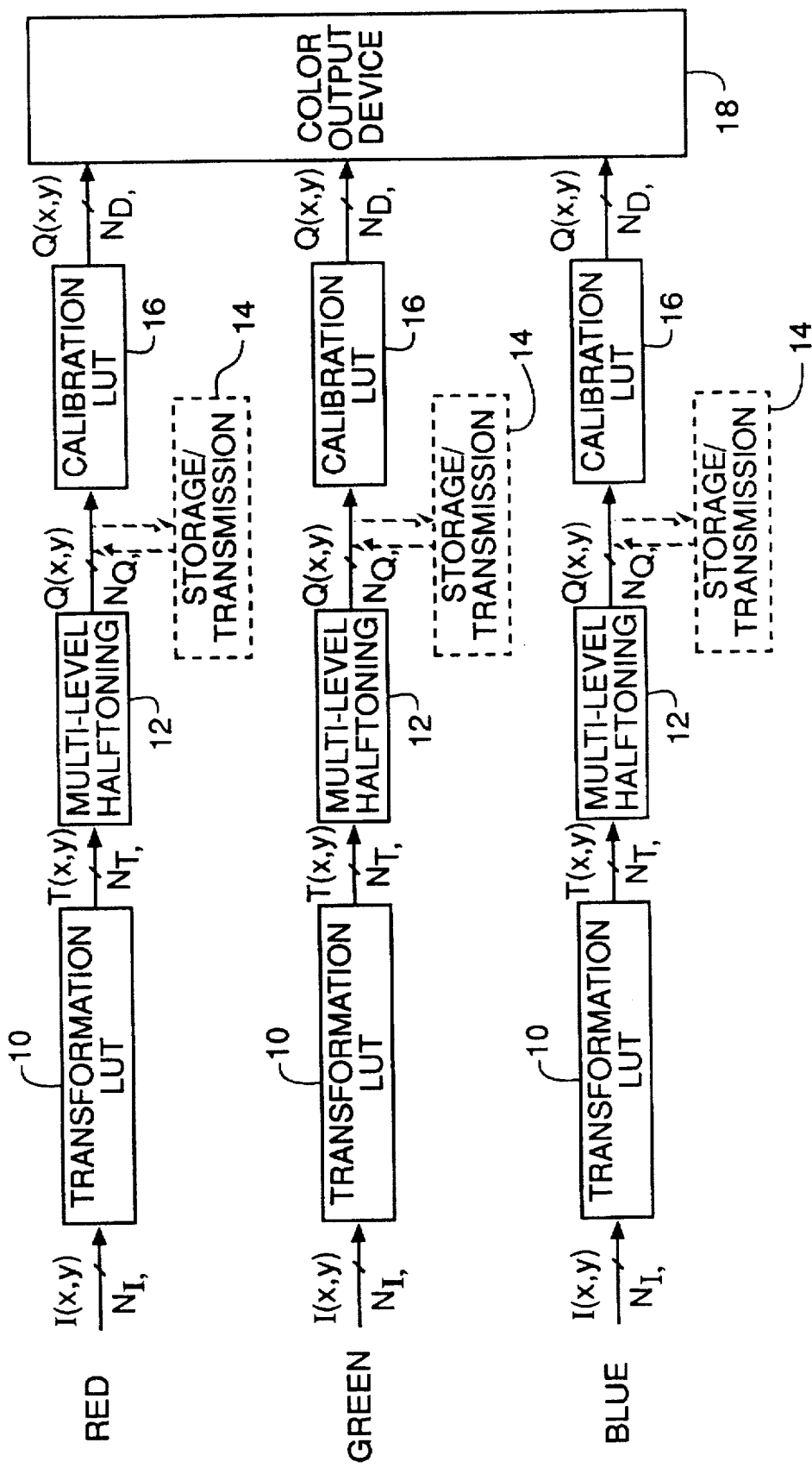
FIG. 4 is an alternative embodiment of the present invention.

As an alternative embodiment of the present invention, FIG. 4 illustrates a method of applying color images to the above described method and devices. This method includes applying each of the above described steps to each color channel. For example, in the case of a three-channel RGB color image, where the R, G, and B subscripts respectively indicate the red, green and blue channels, the transformation LUTs 10, multi-level halftoning algorithms 12, and the calibration LUTs 16 may or may not be different for each of the three channels.

For systems which process color images, the transformation LUTs 20 may be computed using a number of different approaches. In the preferred embodiment of this invention, the same transformation LUT 20 is used for each of the color channels, and the values stored in the transformation LUTs 20 are computed so that the perceived lightness difference between sequential transformed levels for neutral colors is approximately constant. For example, consider the case where the input device is a color video display having 8-bit values for each of the red, green and blue channels. Neutral colors can be formed using equal red, green and blue input code values. The normalized intensity for each of the channels can be compute using Eq. (1). The tristimulus values can then be computed by applying a matrix correction to a vector containing the normalized intensities:

$$\begin{vmatrix} X \\ Y \\ Z \end{vmatrix} = \begin{vmatrix} m00 & m01 & m02 \\ m10 & m11 & m12 \\ m20 & m21 & m22 \end{vmatrix} \begin{vmatrix} I_R \\ I_G \\ I_B \end{vmatrix} = M \begin{vmatrix} I_R \\ I_G \\ I_B \end{vmatrix}, \quad (5)$$

where M is the phosphor matrix and $I_R$, $I_G$ and $I_B$ are the normalized intensities for the red, green, and blue channels, respectively. Generally for a neutral, $I_R = I_G = I_B = I$, so that $$\frac{Y}{Y_0} = \frac{m10\, I_s + m11\, I_G + m12\, I_B}{m10 + m11 + m12} = \frac{(m10 + m11 + m12)I}{m10 + m11 + m12} = I, \quad (6)$$

which is equivalent to the result for the single channel image. This approach will insure that the maximum visibility of the halftone patterns for the neutral patches is minimized.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form herein before described being merely a preferred or exemplary embodiment thereof.

What is claimed is:

1. A method for forming a multi-level halftone image from an input digital image having a plurality of pixels so that visibility of halftone patterns is minimized, comprising the steps of:

(a) transforming input pixel values which represent the tone level of each pixel into modified pixel values which are approximately linear with perceived lightness so that the modification of each said modified pixel value is based on input from only a single channel;

(b) applying a multi-level half toning process to the modified pixel values to produce halftone pixel values having a reduced number of tone levels which are uniformly distributed with respect to the modified pixel values; and (c) transforming the halftone pixel values into output pixel values for permitting an output device to display the digital image so that visibility of halftone patterns is minimized.

2. The method as in claim 1, wherein the transformation of step (a) is implemented using a look-up table which stores the modified pixel value corresponding to each of the input pixel values.

3. The method as in claim 1, wherein the modified pixel values are linear with CIE L* values.

4. The method as in claim 1, wherein the multi-level halftoning process in step (b) is a multi-level dither process.

5. The method as in claim 1, wherein the multi-level halftoning process in step (b) is a multi-level error diffusion process.

6. The method as in claim 1, wherein the transformation of step (c) is implemented using a look-up table which stores the output pixel value corresponding to each of the halftone pixel values.

7. The method as in claim 1 further comprising the step of storing the halftone pixel values in a storage device.

8. The method as in claim 1, wherein steps (a), (b) and (c) are applied to each channel of a digital image having two or more channels.

9. The method as in claim 1, wherein the halftone pixel values are transmitted across a digital communication channel for displaying on a remote device.

10. The method as in claim 1, wherein the output device is a printer.

11. The method as in claim 10, wherein steps (a), (b) and (c) are performed in a processor of the printer.

12. A system for forming a multi-level halftone image from an input digital image having a plurality of pixels so that visibility of halftone patterns is minimized, comprising:

(a) means for transforming input pixel values which represent the tone level of each pixel into modified pixel values which are approximately linear with perceived lightness so that the modification of each said modified pixel value is based on input from only a single channel;

(b) means for applying a multi-level halftoning process to the modified pixel values to produce halftone pixel values having a reduced number of tone levels which are uniformly distributed with respect to the modified pixel values; and (c) means for transforming the halftone pixel values into output pixel values for permitting an output device to display the digital image so that visibility of halftone patterns is minimized.

13. The system as in claim 12, wherein said means for transforming input pixel values into modified pixel values is a look-up table which stores the modified pixel value corresponding to each of the input pixel values.

14. The system as in claim 13, wherein said means for transforming the halftone pixel values into output pixel values is a look-up table which stores the output pixel value corresponding to each of the halftone values.

15. The system as in claim 12 wherein said means for applying a multi-level halftoning process further includes applying a multi-level dither process.

16. The system as in claim 12 wherein said means for applying a multi-level halftoning process further includes applying a multi-level error diffusion process.

17. A method for forming a multi-level halftone image from an input image having a plurality of pixels so that the visibility of halftone patterns is minimized, comprising the steps of:

(a) transforming input pixel values which represent a tone level of each pixel using a look-up table to form modified pixel values which are approximately linear with perceived lightless so that the modification of each said modified pixel value is based on input from only a single channel;

(b) applying a multi-level halftoning process to the modified pixel values for each color channel to produce halftone pixel values having a reduced number of tone levels which are uniformly distributed;

(c) storing the halftone pixel values in a digital memory; and (d) retrieving the halftone pixels from the digital memory and transforming the halftone pixel values using a look-up table to form output pixel values for permitting an output device to display the digital image so that the visibility of halftone patterns is minimized.

18. A method for forming a color multi-level halftone image from a color input image having more than one color channel having a plurality of pixels so that the visibility of halftone patterns is minimized, comprising the steps of:

(a) transforming input pixel values which represent the tone level of each pixel for each color channel into modified pixel values which are approximately linear with perceived lightness for colors which are neutral so that the modification of each said modified pixel value is based on input from only a single channel;

(b) applying a multi-level halftoning process to the modified pixel values for each color channel to produce halftone pixel values having a reduced number of tone levels which are uniformly distributed; and (c) transforming the halftone pixel values for each color channel into output pixel values for permitting an output device to display the digital image so that visibility of halftone patterns is minimized.

19. The method as in claim 18, wherein the transformation of step (a) is implemented using a look-up table which stores the modified pixel value corresponding to each of the input pixel values.

20. The method as in claim 18, wherein the modified pixel values are linear with CIE L* values.

21. The method as in claim 18, wherein the multi-level halftoning process in step (b) is a multi-level dither process.

22. The method as in claim 18, wherein the multi-level halftoning process in step (b) is a multi-level error diffusion process.

23. The method as in claim 18, wherein the halftone pixel values are transmitted across a digital communication channel for displaying on a remote device.

24. The method as in claim 18, wherein the output device is a printer.

25. The method as in claim 24, wherein steps (a), (b) and (c) are performed in a processor of the printer.

26. The method as in claim 18, wherein the output device is a video display.

27. The method as in claim 18, wherein the transformation of step (c) is implemented using a look-up table which stores the output pixel value corresponding to each of the halftone pixel values.

* * * * *